United States Patent
Gil Bulacio et al.

(10) Patent No.: US 11,315,024 B2
(45) Date of Patent: Apr. 26, 2022

(54) COGNITIVE COMPUTING SYSTEMS AND SERVICES UTILIZING INTERNET OF THINGS ENVIRONMENT

(71) Applicant: KYNDRYL, INC., New York, NY (US)

(72) Inventors: Francisco J. Gil Bulacio, Santiago (CL); Patrick R. Madrones Rodriguez, Recoleta (CL); Javier E. A. Burgos Duran, Santiago (CL); Juan P. Soto Gomez, Santiago (CL); Juan C. Renzulli, Bogota (CO)

(73) Assignee: Kyndryl, Inc., New York, NY (US)

( * ) Notice: Subject to any disclaimer, the term of this patent is extended or adjusted under 35 U.S.C. 154(b) by 874 days.

(21) Appl. No.: 16/017,186

(22) Filed: Jun. 25, 2018

(65) Prior Publication Data

US 2019/0392328 A1 Dec. 26, 2019

(51) Int. Cl.
*G06N 5/02* (2006.01)
*H04L 41/16* (2022.01)
(Continued)

(52) U.S. Cl.
CPC .......... *G06N 5/022* (2013.01); *H04L 41/0677* (2013.01); *H04L 41/16* (2013.01); *H04L 63/16* (2013.01); *H04L 67/12* (2013.01)

(58) Field of Classification Search
CPC .......... G06N 5/02; G06N 5/025; G06N 5/041; G06N 5/046; H04L 63/16; H04L 41/16; H04L 67/12; H04L 41/0677; H04L 63/20; H04L 41/5019; H04L 41/0668; H04L 41/14; G06F 15/173
See application file for complete search history.

(56) References Cited

U.S. PATENT DOCUMENTS

2016/0006815 A1 1/2016 Dong et al.
2017/0006141 A1* 1/2017 Bhadra ................ H04W 84/18
(Continued)

FOREIGN PATENT DOCUMENTS

WO 2013123445 8/2013

OTHER PUBLICATIONS

Knowles, Greg; Watson IoT Platform Analytics—Covering analytics needs; https://developer.ibm.com/iotplatform/2071/03/15/watson-iot-platform-analytics-covering-iot-analytics-needs/; Mar. 15, 2017; 9 pages.
(Continued)

*Primary Examiner* — Joe Chacko
(74) *Attorney, Agent, or Firm* — Schmeiser, Olsen & Watts; Erik Swanson

(57) ABSTRACT

A system and method provide cognitive computing services, comprising: one or more Internet of Things (IoT) sensors; an edge analytics device that performs a preliminary analysis of the IoT sensor data; a cloud computing device of the cloud environment that stores a set of application programming interfaces (APIs) for interfacing between the cloud environment and the IoT sensors and an underlying infrastructure; an analytics device that performs analytics on the IoT sensor data; and a cognitive computing device that regulates one or more of the IoT sensors or the edge analytics device by modifying one or more rules performed by the one or more of the IoT sensors or the edge analytics device.

16 Claims, 8 Drawing Sheets

(51) Int. Cl.
　　　*H04L 67/12*　　　(2022.01)
　　　*H04L 41/0677*　　(2022.01)
　　　*H04L 29/06*　　　(2006.01)

(56) References Cited

U.S. PATENT DOCUMENTS

| | | |
|---|---|---|
| 2017/0060574 A1 | 3/2017 | Malladi et al. |
| 2017/0201585 A1 | 7/2017 | Doraiswamy et al. |
| 2018/0227199 A1* | 8/2018 | Liu .................. H04L 69/18 |
| 2019/0182333 A1* | 6/2019 | Bartfai-Walcott ...... H04L 47/70 |

OTHER PUBLICATIONS

Raphael, Chris; IoT Architectures for Edge Analytics; https://www.rtinsights.com/iot-architectures-for-edge-analytics; retrieved from the Internet Aug. 10, 2017; 5 pages.

Reale, Andrea; A guide to Edge IoT analytics; Internet of Things blog; https://www.ibm.com/blogs/internet-of-things/edge-iot-analytics/; Feb. 23, 2017; 12 pages.

Constant, Nicholas et al.; Fog-Assisted wIoT: A Smart Fog Gateway for End-to-End Analytics in Wearable Internet of Things; The 23rd IEEE Symposium on High Performance Computer Architecture; Feb. 4-8, 2017; pp. 1-5.

Mell, Peter et al.; "The NIST Definition of Cloud Computing;" National Institute of Standards and Technology; Special Publication 800-145; Sep. 2011; 7 pages.

\* cited by examiner

COGNITIVE COMPUTING SYSTEMS AND SERVICES UTILIZING INTERNET OF THINGS ENVIRONMENT

BACKGROUND

The present invention relates to a cognitive computing architecture deployed by an Internet of Things (IoT) environment, and more specifically to embodiments of a system and method for providing cognitive computing services that include a plurality of computer-based elements where an IoT hybrid infrastructure provides analytics and cognitive services.

The modern Internet has evolved from a network of interconnected personal computers to include millions or billions of physical devices ranging from home appliances to other electronic objects that include processors, software, sensors, actuators, and/or network connectors configured to exchange various mechanical, thermal, magnetic, electrical, optical, molecular, and/or chemical signals via the Internet for processing by other computers in a cloud, analytics, and/or cognitive computing environment.

SUMMARY

An embodiment of the present inventive concepts relates to a system for providing cognitive computing services, comprising: a computing device that receives data from one or more Internet of Things (IoT) sensors; an edge analytics device that performs a preliminary analysis of the IoT sensor data to validate the data to determine whether the data is to be transmitted across a network and receive cognitive data to generate cognitive analytics locally at an edge of the network; a fog computing device that provides a decentralized computing infrastructure in which the IoT sensor data is distributed between the sensors and a cloud environment; a cloud computing device of the cloud environment that stores a set of application programming interfaces (APIs) for interfacing between the cloud environment and the IoT sensors and an underlying infrastructure; an analytics device that performs analytics on the IoT sensor data by implementing an algorithmic process stored in the cloud environment and applying a programming model using at least one of machine learning, statistical modeling, or other mathematics based on training data to generate a decision system; and a cognitive computing device that regulates one or more of the IoT sensors or the edge analytics device by modifying one or more rules performed by the one or more of the IoT sensors or the edge analytics device, wherein the IoT sensors identifies a service executed by the edge analytics device to perform an action, and the edge analytics device in response to the cognitive computing device outputs an instruction to modify the rules.

Another embodiment of the present invention relates to a system for providing A system for providing cognitive computing services in a decentralized computing infrastructure in which sensor data is distributable between one or more sensors and a set of remote computer servers hosted in a computer network, comprising a computing device at an edge of the computer network that is configured to receive the sensor data from the one or more sensors, and that is further configured to perform a preliminary analysis of the sensor data to validate the data to determine whether (i) the sensor data is to be transmitted across the computer network to the set of remote computer servers for further use by at least one computer selected from the group consisting of a first special-purpose computer and a second special-purpose computer or (ii) an analytics operation is to be generated on the sensor data at the edge of the computer network; the first special-purpose computer that is configured to perform analytics on the sensor data by implementing an algorithmic process stored at the remote computer servers, wherein the process includes an analysis of data received by the remote computer servers; and the second special-purpose computer that is configured to regulate rules performed by at least one device selected from the group consisting of the one or more sensors and the computing device at the edge of the computer network by generating an instruction to modify one or more of the rules according to a result of the analytics of the sensor data performed by the first special-purpose computer.

Another embodiment of the present invention relates to a system comprising a computing device that receives data from one or more Internet of Things (IoT) sensors and that performs a preliminary analysis of the IoT sensor data to validate the data to determine whether the data is to be transmitted across a network and receiving cognitive data to generate cognitive analytics locally at an edge of the network or whether the data, in response to a receipt of information regarding a failure whether to output the data to an auxiliary computing location, wherein in response to a receipt of a call complies with the a preprocessing of warning parameters; and a special-purpose computer that uses the IoT sensor data to process a set of data analytics based on a corpus in which patterns and trends are established that incorporate artificial intelligence from the special-purpose computer.

Another embodiment of the present invention relates to a method for cognitive computing, comprising: receiving, by a processor of a computing system, data from one or more Internet of Things (IoT) sensors; performing, by the processor, analytics at a network edge to match contents of the data with a predetermined business rule to involve an early action on the data; executing, by the processor, a cognitive process to address received inquiries related to the IoT sensor data; and changing, by the processor, the business rule in real-time at the network edge in response to a result of the cognitive process.

DETAILED DESCRIPTION

Figure 1:
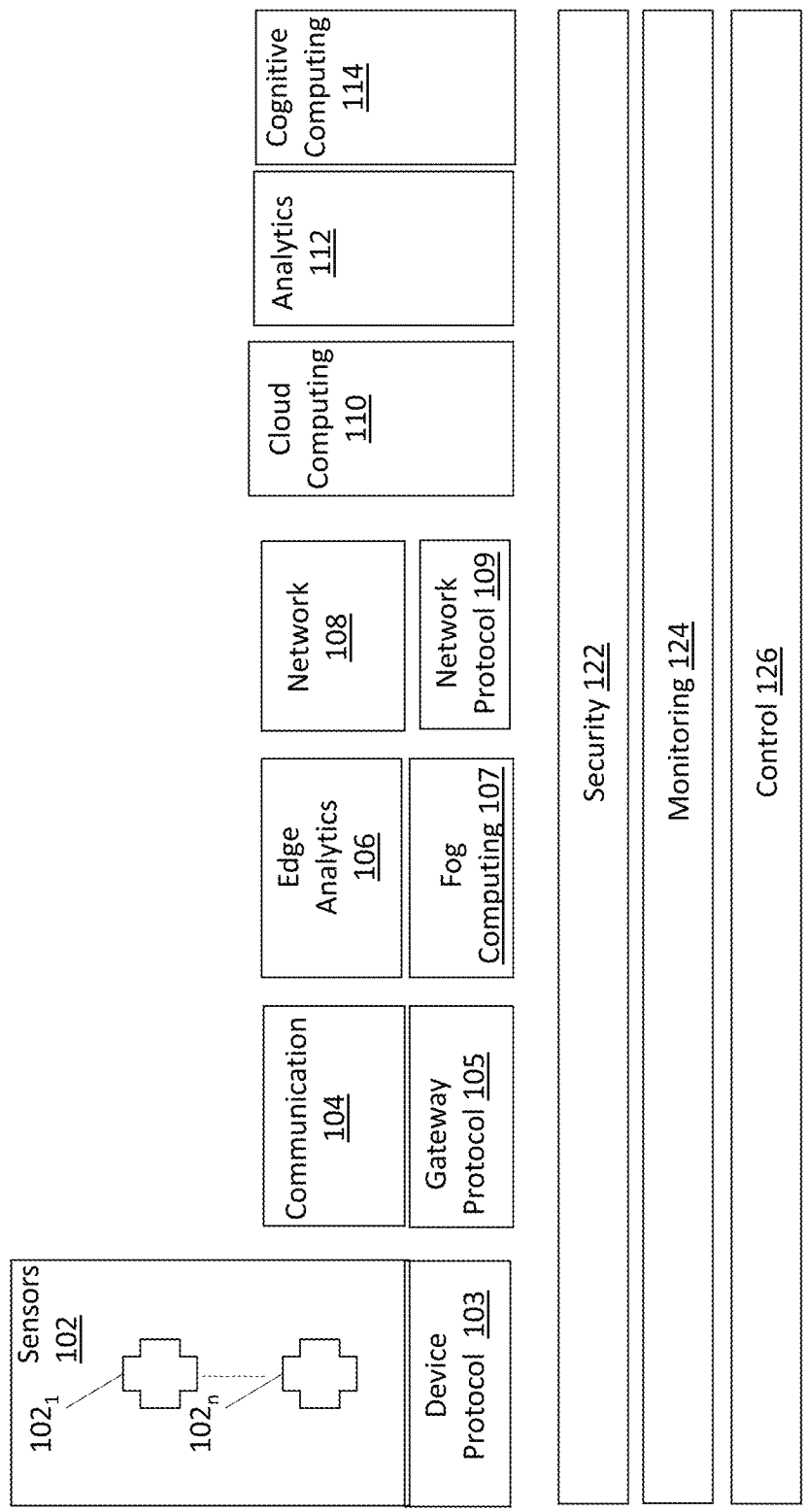
FIG. 1 depicts a block diagram of a computing architecture constructed and arranged for providing a cognitive service, in accordance with embodiments of the present invention.

As Internet of Things (IoT) devices grow in popularity and are connected to the Internet, a technology platform is required to accommodate applications such as cognitive computing, which may rely on the billions of sensors available in an IoT environment as part of data gathering for generating a result. Embodiments of the present inventive concepts provide a technology platform that is constructed and arranged satisfy many different criteria with respect to the processing of data related to cognitive computing services. A variety of wired and wireless network connection standards accommodate heterogeneous signal processing systems required for connecting IoT devices to a communication network such as the Internet. Sufficient data bandwidth is offered to prevent the risk of an overload of data, which can affect performance and reaction time with respect to different events. In some embodiments, at least one edge computing device is implemented in a manner that prevents a general reduction in speed across the system where received data is output to various sources without first processing the data to determine if it is valid. On the other hand, this data may be received in a structured manner to arrive at well-purged sources for analytic-related processing. However, not all data may be output to the cognitive computing or analytic systems. Instead, prior to receipt, a machine learning process may receive the data which implements hypotheses and so on used in a training model which provides a level of cognitive learning, automatically correcting a current model.

In brief overview, provided in some embodiments is an end-to-end framework that employs an IoT hybrid infrastructure comprising a combination of computer-based elements, including end devices, gateways, edge and fog computing devices, a data communications network, cloud computing, analytic systems, and artificial intelligence for performing analytics and cognitive services in a manner that accommodates the requirements mentioned above. The IoT hybrid infrastructure coexists with conventional, proprietary, and/or monolithic systems and third-party sensors by including a computing protocol converter that converts a protocol implemented by the conventional system to permit a data exchange with embodiments of an IoT computing architecture. The framework and computing architecture defines a standardized set of concepts, practices, and criterion that allows for a demand in IoT technology and models the general relationships, such as domain entities, to provide a structure and a working methodology. The interoperability is performed by applying sets of the defined standards and determined patterns for the purpose of orchestrating the elements to solve problems in an IoT environment. Also, cognitive computing services may be offered regardless of whether failures or anomalous events occur in the network, at the edge of the network, for example, an internal network of the edge, or otherwise along a data path from IoT sensors to a cloud computing environment.

In some embodiments, a security system is included that addresses the risks of data breaches or other threats, for example, by preventing potentially damaging data from being injected into an IoT system, despite the various technologies interoperating to allow for an end to end data exchange between IoT devices and a cognitive computing platform. Other desirable features may include, but are not limited to, adaptability, scalability, flexibility, and interoperability. For example, the system can be configured to be continually or frequently modified and maintained to address changing requirements, rules, parameters, or actions performed by a cognitive computing service.

Referring to the drawings, FIG. 1 depicts a block diagram of a computing architecture constructed and arranged to provide a cognitive service, in accordance with embodiments of the present invention. The computing architecture utilizes the billions of sensors currently connected to modern communication networks including the Internet, and provides a unique environment where analytics and cognitive solutions may be performed.

Embodiments of a system that incorporates some or all of the computing architecture includes a plurality of sensor devices 102, communication devices 104, edge analytics devices 106, a wide area network 108, a cloud computing platform 110, an analytics system 112, and a cognitive computing system 114 and/or other special-purpose computers, which collectively operate to provide an end-to-end framework where analytics and cognitive processing can be performed.

The sensor devices $102_1$-$102_n$ (generally, 102), where n>1, are constructed and arranged to generate raw sensory data collected from an environment in which the sensor devices 102 are positioned, for example, an internal network, intranet, or other network restricted to a defined set of user. In some embodiments, a sensor device 102 is any stand-alone Internet-connected device that can be monitored and/or controlled via wired or wireless electronic communication from a computer at a remote location. Examples may include but are not limited to IoT devices, for example, which are constructed and arranged to collect information related to position, motion, transformation, speed, acceleration, gauge, pressure, volume, temperature, presence, location, touch sensitivity, vision, proximity, acoustics, light, chemical, biological, thermal, radiation, humidity, acid density, and/or be part of any other device capable of transmitting and/or receiving various signals. In some particular embodiments, a sensor device 102 may include one or more of a biometric sensor, a wearable sensor, an environmental sensor, a camera, a camcorder, a microphone, a peripheral device, a computing device, a mobile computing device, such as a smartphone or tablet, facial recognition sensor, voice capture device, and the like. In another example, the sensor devices 102 can be thermometers and accelerometers that measure real-world characteristics and generate numerical information. In another example, the sensor devices 102 can include beacons, load sensors, or actuators that switch equipment on or off or displays that indicate when a device generates raw sensory data of an abnormality. Signal examples may include magnetic, electrical, optical, and molecular signals, but not limited thereto, so long as the signals are used to observe, measure, and quantify with high precision from one or more operational environments.

In some embodiments, the sensor devices 102 represent in a domain or definition those devices from which a data recollection process can be performed via telemetry or other automated process by which the data can be collected and output for monitoring or other purposes. In some embodiments, a sensor device 102 may include an application programming interface (API) interface, socket, or the like, for example, for development or other purposes, which allows the sensor device 102 to exchange data with one or more other elements of the system of FIG. 1. In some embodiments, an API interface may replace or be used in addition to an application executed by a processor of a sensor device 102.

In some embodiments, the sensor devices 102, when connected to each other as part of an IoT ecosystem, transmit information using a device protocol layer 103, which is configured to transmit the raw sensory data to one or more network communication devices 104, such as gateways, routers, and so on. Examples of the device protocol layer 103 may include but not be limited to TCP-UDP, XMPP-Message Queue Telemetry Transport (MQTT), MQTT-SN, HTTP-CoAP, Web Socket, REST-JSON, JAVA-C/C++, and so on.

The communication devices 104 may comply with technologies such as but not limited to devices such as Bluetooth™, Zigbee™, Z-Wave, WiFi, GSM/GPRS, UMTS/HSPA, LTE, and so on. The number of sensor devices 102 connecting to the communication devices 104 via wireless connections, data bus lines, and/or over network 108 may vary from embodiment to embodiment, depending on the number of sensor devices 102 present in the system. The communication devices 104 may execute a gateway protocol 105 for receiving and processing the raw sensory data via the device protocol layer 103. Example gateway protocols 105 and/or related technologies may include but not be limited to Sigfox, LoRaWAN, GSM/GPRS, EDGE, UMTS/HSPA, and LTE. For example, the communication device 104 may include Sigfox wireless system that receives data transmissions from devices 102 such as a parking sensor or water meter.

In sum, an edge analytics device 106 can be a computing device at an edge of the computer network that is configured to receive the sensor data from the one or more sensors, and that is further configured to perform a preliminary analysis of the sensor data to validate the data to determine whether the sensor data is to be transmitted across the computer network to a set of remote computer servers, for example, in a cloud computing environment 110 for further use by at least one of a first special-purpose computer, such as the analytics system 112 and a second special-purpose computer such as the cognitive computing system 114 and/or determine whether an analytics operation is to be generated on the sensor data at the edge of the computer network.

The edge analytics devices 106 are constructed and arranged to execute a spectrum of analytics, for example, from the analytics system 112, and to provide for data processing and analytical computations to be performed at the edge of the network 108 and close to the signal source, i.e., the sensor devices 102, instead of waiting for data to be sent back to the backend services, i.e., the analytics system 112 and/or cognitive computing system 114. By eliminating the distance and time it takes to send data to a set of remote computer servers hosted at the network 108, for example, a computer server hosted at a cloud 110 or other centralized source, the speed and performance of data exchanged can be increased, for example, with respect to communications with devices and applications at the network edge. Also, the edge analytics devices 106 allow received data to be forwarded to the cognitive computing system 114 for additional analytic processing, dashboard visualization, as input to other analytics and/or storage in a cloud-based historian repository at a hosted environment, such as a computer server at the cloud 110, which can store historical data, for example, sensor data. The analytical services can be codified and executed on gateways, industrial computers, routers or servers in the local environment. Analyzing data as it is generated decreases latency in responding to emerging conditions, and increases seal ability by filtering out low value data and reducing the network burden of moving large volumes of data. Also, by distributing cognitive analytics to the edge of the network 108 based on data received from a communication device 104, a set of analytics can be applied locally.

In some embodiments, an edge analytics device 106 includes a streaming engine or the like which is optimized for edge processing. For example, edge analytics may be defined and managed in the cloud computing platform 110, also referred to as the cloud, but distributed out into the IoT network to collect, analyze and respond to conditions at the source with very low latency in the decision-making process on connected devices, and without the need to send data to the cloud 110. Thus, the edge analytics devices 106 may permit analytics to be performed at the edge of the network 108 so that collected data can be analyzed and responded to at the edge of the network 108. In some embodiments, the edge analytics device 106 determines where to send the information, for example, to an analytics device 112 in case it does not fail, or to an auxiliary cloud or auxiliary support environment in case of failure. In doing so, the edge analytics device determines a destination of the IoT sensor data depending on whether a failure is detected. For example, referring to FIG. 3, a determination can be made whether data can travel through firewalls of a secure network. Here, if the network does not detect information that permits the transfer through the network, then the data can be automatically directed to a backup cloud 120. In cases where the data is sent to the analysis device, it can store the data where it can subsequently processed by a training algorithm or the like.

Another function of the edge analytics device 106 may include but not be limited to the generation of early alerts, notifications, monitoring, rules definition, and streamed data. Since the edge analytics devices 106 are closer to the sensor devices 102 than the backend systems such as analytics computing system 112, the edge analytics devices 106 can interact with the sensor devices 102 which generate signals that trigger early alerts, notifications, and so on from a set of business rules that are processed by the edge analytics devices 106 and therefore does not need to extend to the backend systems and services. In this manner, electronic signals from the sensor devices 102 can be transformed at the edge analytics devices 106 into data pertaining to unique topics that saves large amounts of information from being transmitted to a the backend system. Also, this feature allows for computer-based actions to be performed locally by the edge analytics devices 106, prior to that data being forwarded to an IoT platform 111 with respect to the cloud 110. For example, a set of business rules embodied in program code may be stored at a Docker container, virtual machine, or other unit of software within the network edge and processed by a programming tool such as Node-Red, which can couple hardware devices, APIs and the cognitive computing services together. The IoT platform 111 and edge analytics device 106 can each comply with the MQTT protocol for communication with respect to publishing and subscription regarding rules and so on. In some embodiments, the IoT platform 111 and edge analytics device 106 exchange data that includes the receipt of a load that is sent in flags between the edge 106 and the cloud 110, the applications registered for the collection receives the messages, and are stored in source devices connected to the analytics system 112, which will execute any training data, new updates, and so on. In some embodiments, the edge analytics device 106 includes a Docker tool chain or the like for communicating with a fog director of the fog computing devices 107 to facilitate data exchanges with an application-specific computing environment, for example, a sales training environment.

In some embodiments, the edge analytics devices 106, in addition to supporting data analysis at the network edge, can contribute to a purging of data to the cloud 110, and in doing so also exposes web service and MQTT messaging, for different flags depending on the business. Here, a device may provide unique and personal services which can be modified only by calls of the APIs and/or cognitive computing system 114 in parameters that are required to update for a particular measurement, for example, according to a particular line of business.

In some embodiments, the edge analytics devices 106 may include third party computing devices, for example, configured to include a software developer kit (SDK) for devices that support Java™ or as a distributed service (DSLink) or the like. The SDK permits a plug-in component or agent to integrate with a gateway or other network communication device 104 to provide for protocol translation and data integration so that data can be analyzed quickly at the edge without worrying about intermittent network connectivity, latency, cost, or bandwidth. In some embodiments, the plug-in or agent offered by the SDK can integrate an edge analytics device 106 and data into a computer platform that executes some or all of the cognitive computing system 114. Other features offered by the SDK permits the other edge analytics device 106 and/or gateway or other network communication device 104 to identify and register devices with the edge analytics agent and the cognitive computing system 114, connect devices and data to the edge agent, respond to alerts and handle actions when the analytics identify interesting conditions, manage the state of local analytics including monitoring, starting, and stopping, communicate in a secure manner with the cognitive computing system 114.

The fog computing devices 107 may coexist with or be part of the edge analytics devices 106, and provide a decentralized computing infrastructure in which data, compute, storage and applications are distributed between the sensor devices 102 and the cloud-computing platform 110. In particular, the fog computing devices 107 facilitates the operation of compute, storage and networking services between sensor devices 102, also referred to as end devices, and cloud computing 110. For example, the fog computing devices 107 may include a plurality of nodes that receive feeds from the sensor devices 102 using any protocol, in real time, run IoT-enabled applications for real-time control and analytics, with a minimum response time, for example, in milliseconds, provide transient storage, and send periodic data summaries to the cloud 110. Fog computing accelerates awareness and response to events by eliminating a round trip to the cloud 110 for analysis, and eliminates the need for costly bandwidth by offloading gigabytes of network traffic from the core network, while also providing a level of security since the fog computing devices and/or edge analysis devices 106 analyze IoT data within a protected company location rather than outside the company at a remote data center or the like.

The fog computing devices 107 can perform transactions and make use of resources at the network edge instead of making immediate use of channels to store information in the cloud where the process is performed. Therefore, it reduces the use of bandwidth by avoiding sending too much information via cloud channels and/or routers. Accordingly, rules can be executed more quickly since the edge is dealt with in real-time or near real-time by the fog computing devices 107 executing business rules to decide which data to process locally and which to send to the cloud, and dynamically adjusting rules based on pattern recognition, prediction, and anomaly detection. For example, a rule may be executed that establishes that if a sensor device 102 detects an event of interest such as an increased temperature in a forest (see FIG. 5 example), live video should be streamed over a cellular network 108 to an operations center, which can reduce the need for constant and expensive live video streaming. As described herein, this rule may be changed in response to a request made by the cognitive computing system 114. In some embodiments where the edge analytics devices 106 includes or communicates with fog computing devices 107, one or more of the edge analytics devices 106 and/or fog computing devices 107 communicates with the cloud 110 to purge relevant data from the cloud 110.

The network 108 is arranged for transporting data to the cloud. The network 108 may refer to a group of two or more computer systems linked together. Network 108 may be any type of computer network known by individuals skilled in the art. Examples of computer networks 108 may include a LAN, WAN, campus area networks (CAN), home area networks (HAN), metropolitan area networks (MAN), an enterprise network, cloud computing network 110 (either physical or virtual) e.g. the Internet, a cellular communication network such as GSM or CDMA network or a mobile communications data network. The architecture of the computer network 108 may be a peer-to-peer network in some embodiments, wherein in other embodiments, the network 108 may be organized as a client/server architecture. In some embodiments, the network 108 may further comprise, in addition to the sensor devices 102, a connection to one or more network accessible analytics systems 112 and/or cognitive computing systems 114.

The cloud computing platform 110 provides scalability and elasticity to cope with varying data volume, velocity, and related processing requirements, and provides for the delivery of a shared pool of computing resources, such as hardware such as computer servers, security devices, networking infrastructure, and storage, as well as core IoT applications and associated services so that information, applications, and so on can be exchanged over the Internet. The cloud computing platform 110 may be provided by technologies for dedicated server, managed hosting, and cloud computing, for example, Softlayer, Bluemix, Api Economy, Messagesight or developerWorks. Services may include but not be limited to On Premises, Platform as a Service (Paas), Infrastructure as a Service (IaaS), Software as a Service (Saas), and so on. In some embodiments, the cloud computing platform 110 provides storage for APIs used for creating or tailoring a solution using the end-to-end framework. For example, an IoT Car Diagnostic API may be implemented to assess the health status of a vehicle, by translating error codes in a human-readable form or the like.

In some embodiments, the analytics system 112, also referred to as a first special-purpose computer, includes a processor and memory for performing mathematical algorithms that can provide data analysis in the cloud 110. In some embodiments, the analytics system 112 formulates statistical models, for example, by performing predictive analytics functions. The analytics system 112 may operate different types of analytics, such as but not limited to Apache, SPSS, Cognos, Maximo, PMQ, InfoSphere, Puredata, and Netezza. Other programming models or related features of the analytics system 112 may include but not be limited to those offered by Big Data Analytics, MapReduce, High Performance Data Analytics, and so on.

The cognitive computing system 114, also referred to as a second special-purpose computer, provides for the simulation of human thought processes in a computer model. In some embodiments, the cognitive computing system 114 includes an artificial intelligence system that is capable of answering questions in the natural language. In some embodiments, the cognitive computing system 114 defines complex analytics in which patterns and trends are established and generated and can interact with other elements of the system. In some embodiments, the cognitive computing system 114 can enhance or complement the features provided by the analytics system 112, for example, providing business intelligence and predictive analytics, decision management, content analytics, and so on. These foregoing examples may be processed at an information integration and governance data management and warehouse system, Apache™ Hadoop® apparatus, or other scalable, distributed computing environment. Applications offered may include but not limited to sales forecasting, marketing, finance, risk, operations, fraud, information technology, human resources, and so on.

In some embodiments, a key feature is that the cognitive computing system 114 communicates with the API and/or application installed on the edge 106 and/or sensor 102 devices, which receives requests from the cognitive computing system 114 to modify rules or the like according to a current analysis performed by the analytics system 112, cognitive computing system 114, and/or cloud 110.

Underlying the sensor devices 102, communication devices 104, edge analytics devices 106, a wide area network 108, cloud computing platform 110, analytics system 112, and cognitive computing system 114 may include a security layer 122, a monitoring layer 124, and a governance and compliance layer 126. The security layer 122, monitoring layer 124, and governance and compliance layer 126 span across and communicates with each of the sensor devices 102, communication devices 104, edge analytics devices 106, a wide area network 108, cloud computing platform 110, analytics system 112, and cognitive computing system 114 to ensure proper security and best practices. In some embodiments, one or more APIs provide for a communication exchange between the layers 122, 124, 126 and one or more physical elements such as the computing devices 102, edge analytics devices 106, and so on. The security layer 122 is constructed and arranged to protect information exchanged between the layers and the elements of the computing architecture. For example, the security layer 122 ensures that a secure communication is established when a sensor 102 outputs data to the cloud 110 via the network 108. The monitoring layer 124 is constructed and arranged to monitor each element of the computing architecture, and to generate alerts and notifications when events are detected at any of the computing elements. The governance and compliance layer 126 is constructed and arranged to control the relationships between the various elements to ensure compliance of the various standards encompassing an application of the computing architecture.

Figure 2:
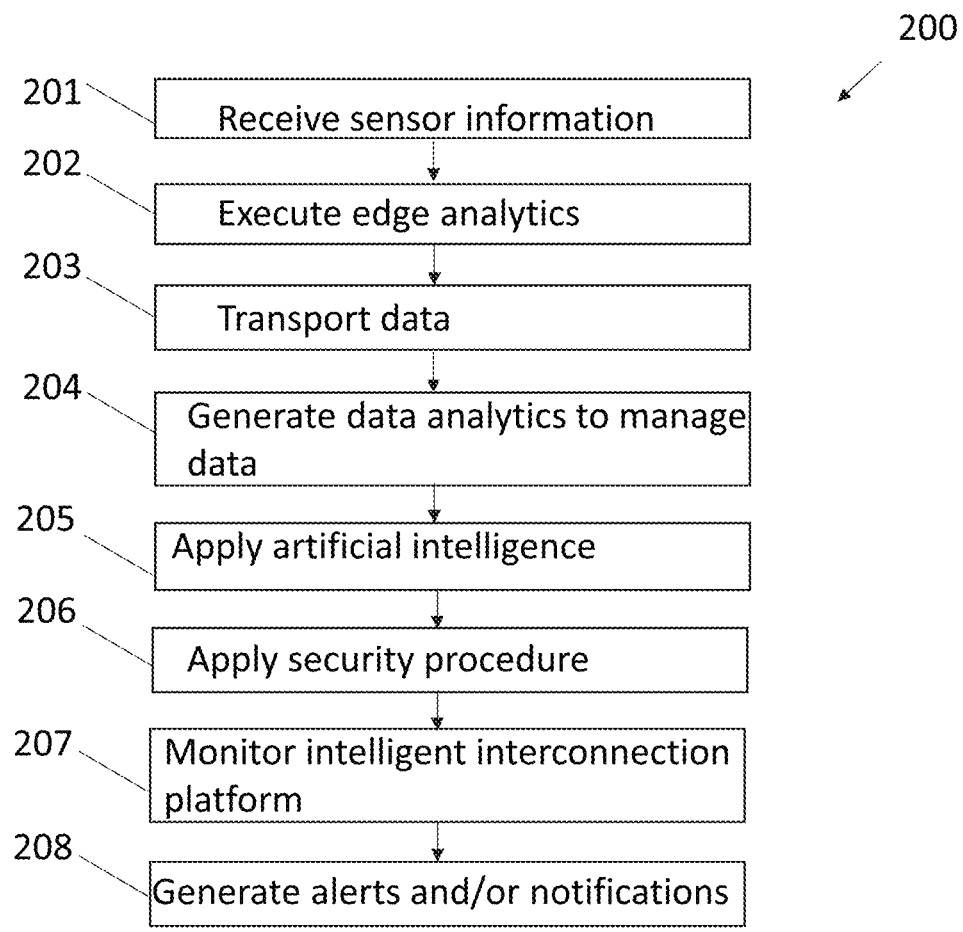
FIG. 2 depicts a flow chart of a method for cognitive computing, in accordance with embodiments of the present invention.

FIG. 2 depicts a flow chart of a method 200 for cognitive computing, in accordance with embodiments of the present invention. One embodiment of the method 200 or algorithm that may be implemented by incorporating some or all of the computing architecture described in FIG. 1, one or more computer systems as defined generically in FIG. 6.

Embodiments of the method 200 for cognitive computing may begin at step 201, wherein sensor data is received by one or more IoT sensor devices 102 using a plurality of network topologies, protocols, and data formats of the device protocol layer 103 between the sensor devices 102 and one or more network communication devices 104. For example, an IoT sensor device 102 may include a thermometer that measures a temperature of an item or region of interest which is processed by the system. In another example, an IoT sensor device 102 may be a camera and microphone for video and audio information about an item or region of interest. In another example, an IoT sensor device 102 may be an actuator, such as an electromechanical relay that switches equipment on or off or displays that indicate when a device reports something abnormal.

The sensor data is transmitted via a communication device 104 to at least edge analytics device 106, which at performs an analytics function by executing real-time processing that matches information in transit with a predetermined business rule to invoke early actions on the sensor data according to the predetermined business rule. For example, a predetermined rule programmed in the edge analytics device 106 can establish data that is filtered and which critical data from the received data to be output to the cloud 110 for further analysis. In another example, distributed data may be processed and analyzed "where it lives," for example, at a computing device in communication with the edge analytics device 106. Here, the edge analytics device 106 after processing can output the data via the network 108 to the cloud computing system 110, analytics 112, and/or cognitive computing 114 systems. In some embodiments, the predetermined business rules are executed at the network edge to perform and control data management in real-time.

At step 203, data is output from the edge analytics devices 106 to the cloud 110 using one or network protocols 109. In some embodiments, IoT data from the sensor devices 102 is filtered prior to output from the edge analytics devices 106, so that the filtered data is relevant to processing and further analysis performed by the analytics 112 and cognitive computing systems 114. In some embodiments, the cloud 110 includes one or more special-purpose computers for providing an intelligent interconnection platform among servers, security devices, or other elements of the networking infrastructure 108, and/or storage.

At step 204, an algorithm, for example, implemented at and executed by the analytics system 112 is selected and performed, for example, a mathematical algorithm that can provide data analysis in the cloud 110, which may be used to provide data analytics using the cloud computing platform 110 to manage data. For example, a typical cloud environment may provide a volume of space for the storage and different set of services for all kind of applications, which can make the data analysis and prediction process became very difficult on the different clusters of cloud. The existing data mining techniques are insufficient to analyze those huge data volumes and identify the frequent services accessed by the cloud users. The analytics system 112 may provide an optimized data and service analysis based on a particular algorithm along with various analytics techniques, which effectively analyze and manage the data which is stored on the cloud storage.

At step 205, a cognitive process may be executed by the cognitive computing systems 114, which can incorporate artificial intelligence technology to answer questions posed using a natural language and enabling definition of complex data analytics based on a corpus in which patterns and trends are setup and generated and can interact with a proposed solution. Example questions may pertain to the IoT sensors, or other topic that may include the IoT sensors.

At step 206, information exchanged between various elements of the computing architecture is made a selected security process from a set of predefined security processes under the security layer 122 of an the intelligent interconnection platform including the servers, security devices, networking infrastructure, and storage.

At step 207, monitoring may be made by the monitoring layer 124, in real time or near real time, of each component of the intelligent interconnection platform including the servers, security devices, networking infrastructure and storage. For example, the monitoring layer collects and processes the network layer information of the TOT.

At step 208, alerts and notifications may be generated by the fog computing device 107 in response to identifying anomalies, to prevent incidents and maintain continuity of operations; and invoking predetermined controlling mechanisms to enforce governance and compliance objectives.

Other embodiments may equally apply to the system described in FIG. 1. For example, the edge analytics device 106 may receive and analyze sensor data, followed by a connection between the IoT platform 111 and an analytics system 112, for example, an SPSS model and rules. A real-time change may occur in the rules as established by the analytics system 112, which is received and processed by the edge analytics device 106. Cognitive information may be output from the cognitive computing system 114 and the analytics system 112, which in turn provides an analytics user interface to the edge analytics device 106 as well as an action definition for performing edge analytics. If the rule is determined to be met, then the edge analytics device 106 can generate a trigger alert or the like. The sensor data can be stored at the cloud 110 or other data storage location.

Figure 3:
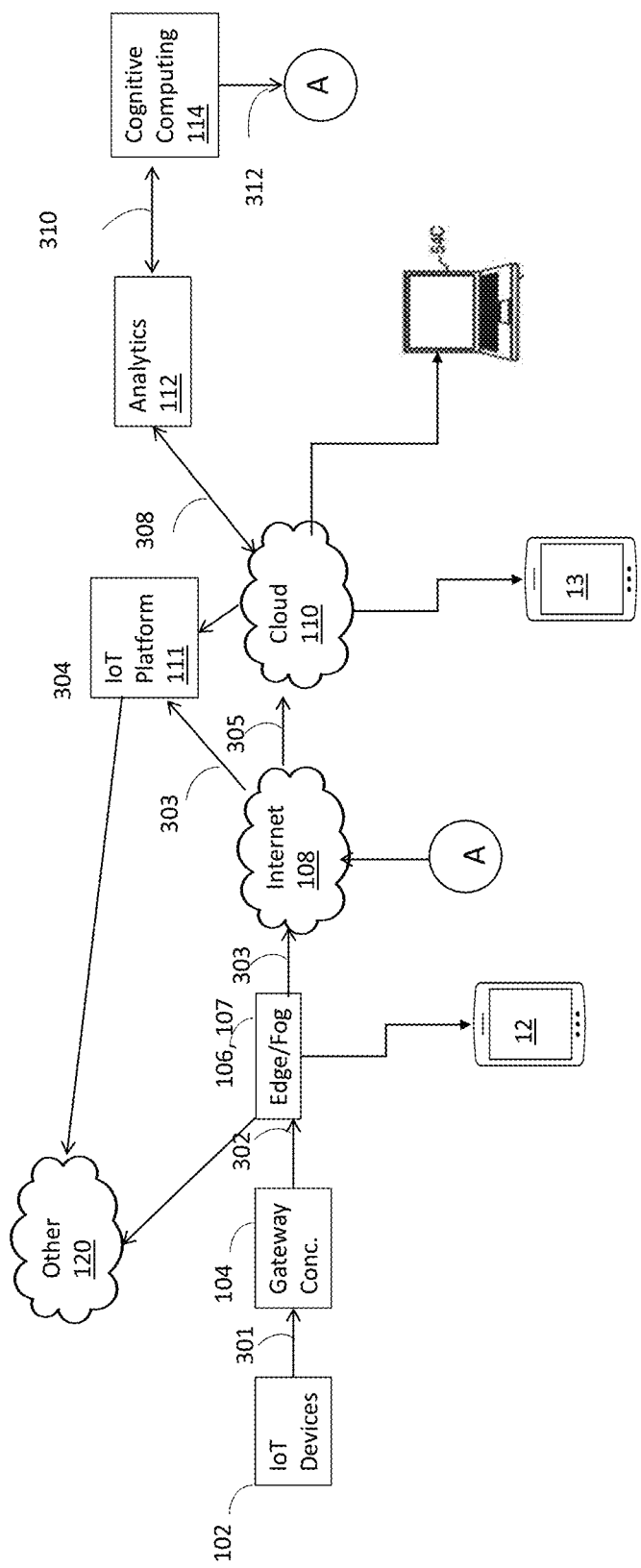
FIG. 3 depicts a diagram of a cognitive computing system and data flow paths between various computing elements of the cognitive computing system, in accordance with some embodiments.

FIG. 3 depicts a diagram of a cognitive computing system and data flow paths between various computing elements of the cognitive computing system, in accordance with some embodiments. Elements of the cognitive computing system may be part of the IoT computing architecture of FIG. 1. Therefore, in describing the various flow paths of the cognitive computing system, reference is made to FIG. 1. FIG. 3 may correspond to the abstraction model of one or more APIs, which represents an interoperable, transversal and omni channel, scalable, evolvable, intelligent and cognitive architecture that is applicable to any business model.

In this illustrative example, one or more dispositive electronic communications are formed between sensor devices 102 via a gateway device, as shown by flow path 301, such as a mesh gateway concentrator device. Such communications may be made via a wireless technology used for these devices may include a low-power and low-rate frequency, for example, 2.4 GHz in compliance with a Zigbee™ protocol. The gateway device, or related network communication device 104, provides a communication routing channel to the edge analytics device 106 and/or fog computing device 107, as shown by flow path 302 by which devices transmit and receive packet information and provides features such as coding, collecting, transmitting, receiving, and decoding the exchanged packet information from the sensor devices 102. In some embodiments, a gateway or other network communication device 104 is configured to manage data communications between a router and server agents or the like. Referring again to flow path 302, the gateway device 104 may form an MQTT (Message Queue Telemetry Transport) communication path to deliver and publish the IoT data.

The edge analytics device 106 as shown in flow path 303 outputs exchanges data regarding rules, alerts, and so on via the network 108 to an IoT platform 111, or via the cloud 110 (flow path 306). In particular, edge analytics are performed by real-time processing dedicated devices of the edge analytics device 106, which match information in transit with predefined business rules. In some embodiments, the edge analytics device 106 and/or fog computing device 107 can perform early actions according to the predefined rules, shown for example at FIG. 4. Any corresponding actions and signals can be monitored by the monitoring layer 124 to make the process more reliable. The type, detail, and features of the monitoring layer 124 may depend on the analytical layer, so that precise monitoring can be performed as distinguished from general monitoring. For example, elements of the system performing an analysis may identify different result patterns, which can be output in the form of video, tabulated, or unstructured data, which can be monitored accordingly. In other embodiments, another flow path 305 may extend via the network 108 to the cloud 110, which in turn may exchange data from the cloud 110 and the IoT platform 111.

IoT computer platform 111 provides middleware or the like configured to establish connectivity between the various IoT elements, i.e., sensor devices 102, communication devices 104, edge analytics devices 108, and elements of the network 108 to the analytics system 112 (flow path 308) and cognitive computing systems 114 (flow path 310). In some embodiments, the IoT computer platform 111 executes a publish-subscribe framework for event-driven computing with respect to a flow path between the IoT computer platform 111 and the analytics system 112. For example, some or all of an analytics system may execute on an Apache Spark™ computer, which processes events in real time and outputs results to a predictive analytics service. Other values may be output from the Apache Spark™ computer to the cognitive computing system 114.

In some embodiments, one or more APIs may be included to allow customization, for example, to establish communications with the cognitive computing device 114, the analytics system 112, unique monitoring systems, and so on. A computing device such as the IoT computer platform 111 may be configured to consume data from one or more IoT devices, i.e., sensor devices 102, and provide the ability to monitor equipment and operations to understand and respond to emerging conditions to improve responsiveness, equipment availability, and overall efficiency. For example, as part of the monitoring layer 124, devices can be monitored to understand current conditions and status, usage patterns, availability, and performance, or environmental conditions to identify security issues and unsafe or undesirable situations.

Other flow paths may extend between an edge 106 and/or fog computing device 107 and a mobile device 12 such as a smart phone illustrates that that mobile device 12 can receive from the edge 106 and/fog 107 computer notifications, alerts, and so on, for example, via a messaging protocol such as MQTT, REST, JSON, or HTML.

Figure 4:
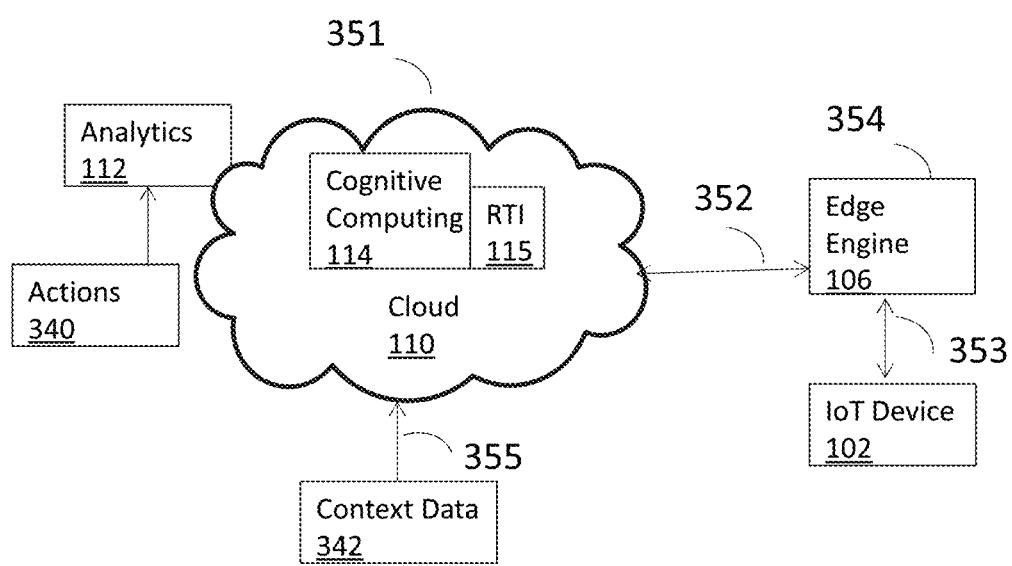
FIG. 4 depicts a detailed set of data flow paths between a cloud and on-premises computing platform, in accordance with some embodiments.

Referring again to flow path 301, as previously described, an electronic communication are formed between sensor devices 102 via a gateway device, as shown by flow path 301. FIG. 4 illustrates a data exchange including such an electronic communication in greater detail according to some embodiments.

In some embodiments, as shown by flow path 312, the cognitive computing system 114 can communicate via the network 108 (shown in FIG. 3), or directly with (not shown) the edge 106 and/or sensors 102, one or more of which can be configured to include an application and/or API interface, for communicating with the cognitive computing system 114. For example, a drone or the like may be configured with a sensor 102 that monitors conditions of an apple farm in compliance with certain parameters, and outputs sensor data within the parameters. The cognitive computing system 114 may establish that new measurement data within a different set of parameters is required so that the drone can collect more accurate data, for example, modified so that the drone measures for trace amounts of a particular pesticide not previously defined in the parameters. At flow path 312, the cognitive computing system 114 outputs an API communication to the edge analytics device 106 which requests a parameter change. The sensor 102 can be modified according to a requested change in the rules according to the parameter change request. Since the sensors 102 can be configured to include an electronic signature that exposes the appropriate services to perform such actions, the resident services are located at and executed by the edge analytics device 106, which can communicate with the sensors 102 via a messaging protocol such as MQTT or the like to modify the rules.

As shown in FIG. 4, at flow path 351, a set of rules and actions 340 may be configured in the cloud 110. At flow path 352, data related to the processed rules and actions may be deployed to an edge engine of the edge analytics device 106. At flow path 353, device data from one or more sensor devices 102 flows to the edge analytics device 106. At flow path 354, the edge engine of the edge analytics device 106 filters and aggregates the device data, performs a rules trigger operation, drives alerts, and the like. For examples, actions performed at the on-premises computing platform, for example, on-site and in communication with the edge analytics device 106, are output or returned to the sensor devices 102, while alerts and cloud actions are output or returned to the cloud 110. At flow path 355, the cognitive computing system 114 can be enriched with context data 342 so that more in-depth cognitive predictive analytics can be performed.

Figure 5:
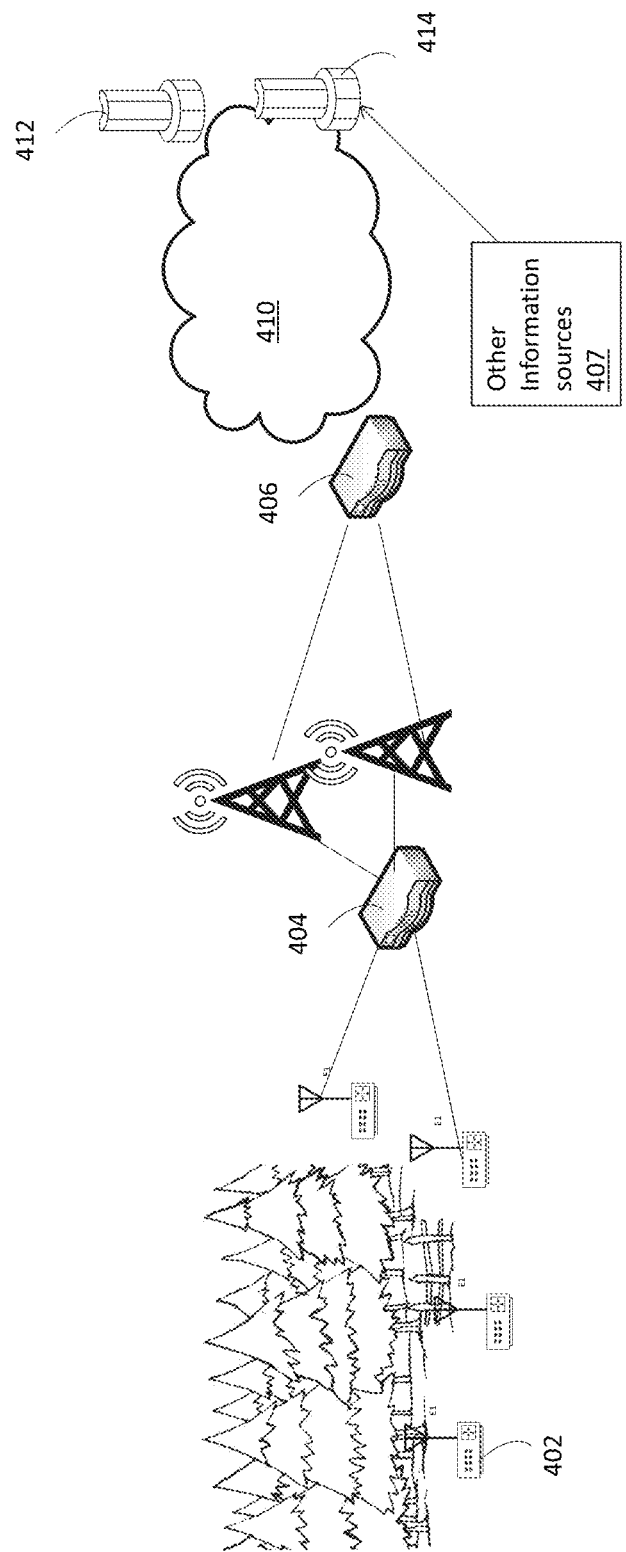
FIG. 5 depicts a diagram illustrating an example application of the computing architecture of FIGS. 1-4, in accordance with some embodiments.

FIG. 5 depicts a diagram illustrating an example of an application of the computing architecture of FIGS. 1-4, in accordance with some embodiments. In this example, a computing architecture is constructed and arranged to prevent forest fires.

A plurality of wireless sensors 402, for example, Libelium Waspnote-compliant devices or the like, are positioned at an area of interest such as a forest, for collecting temperature, humidity, carbon dioxide or other gases, wind change conditions, and/or other information regarding a region in which the sensors 402 are positioned.

An IoT gateway device 404 may communicate via wireless data communications with the sensors 402 to receive collected sensor data, also referred to as field data and output the data to a cloud 410, which in turn permits a cognitive computing system 414 and/or analytics system 412 to process the data. An edge analytics device 406 and/or IoT platform may can analyze the incoming data in real time, test it against the expected results, and trigger an alarm action if the sensor 402 is out of range. Because the alerts are automated, recipients of the alerts can act quickly to extinguish a detected forest fire, or take preemptive measures to prevent future fires from occurring. In addition or alternatively, an electronic signal can be generated and output to an unmanned aerial vehicle (UAV), an emergency response location, and so on to provide a notification of a pending or current forest fire so that action may be taken quickly, for example, to arrive at the site of the detected fire for collecting images of the region, for dousing the fire with water or retardant, and so on.

In addition to field data, other information sources 407 may provide data to the a cognitive computing system 414 and/or analytics system 412. For example, historical data on forest fires may be collected from a remote data repository. Local weather data, social impact data, climate pattern data, and so on may be provide to and processed by the cognitive computing system 414 and/or analytics system 412.

Although this example describes an architecture for preventing forest fires, other applications may equally apply.

Figure 6:
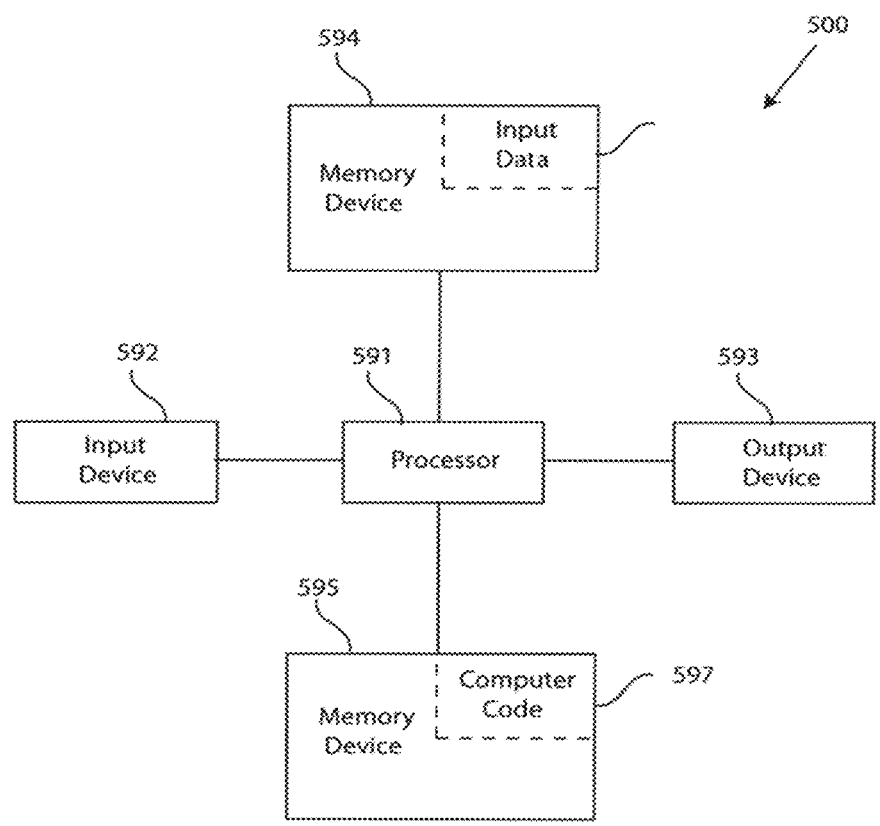
FIG. 6 illustrates a block diagram of a computer system capable of implementing a cognitive service in an IoT computing environment, in accordance with embodiments of the present invention.

FIG. 6 illustrates a block diagram of a computer system 500 that may be included in the system of FIG. 1 and example of FIG. 5 and for implementing the methods illustrated in FIGS. 2 and 3 in accordance with the embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for determining an availability recommendation, in the manner prescribed by one or more elements of the computing architecture described with respect to FIGS. 1-5, wherein the instructions of the computer code 597 may be executed by processor 591 via memory device 595. The computer code 597 may include software or program instructions that may implement one or more algorithms for implementing the methods of providing a recommendation as to an availability of an invitee, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the sensors. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository, for example, part of one or more elements of the computing architecture as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to cognitive computing systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide an availability recommendation using a plurality of metrics of an invitee based on a plurality of factors. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of providing an availability recommendation. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for providing an availability recommendation.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
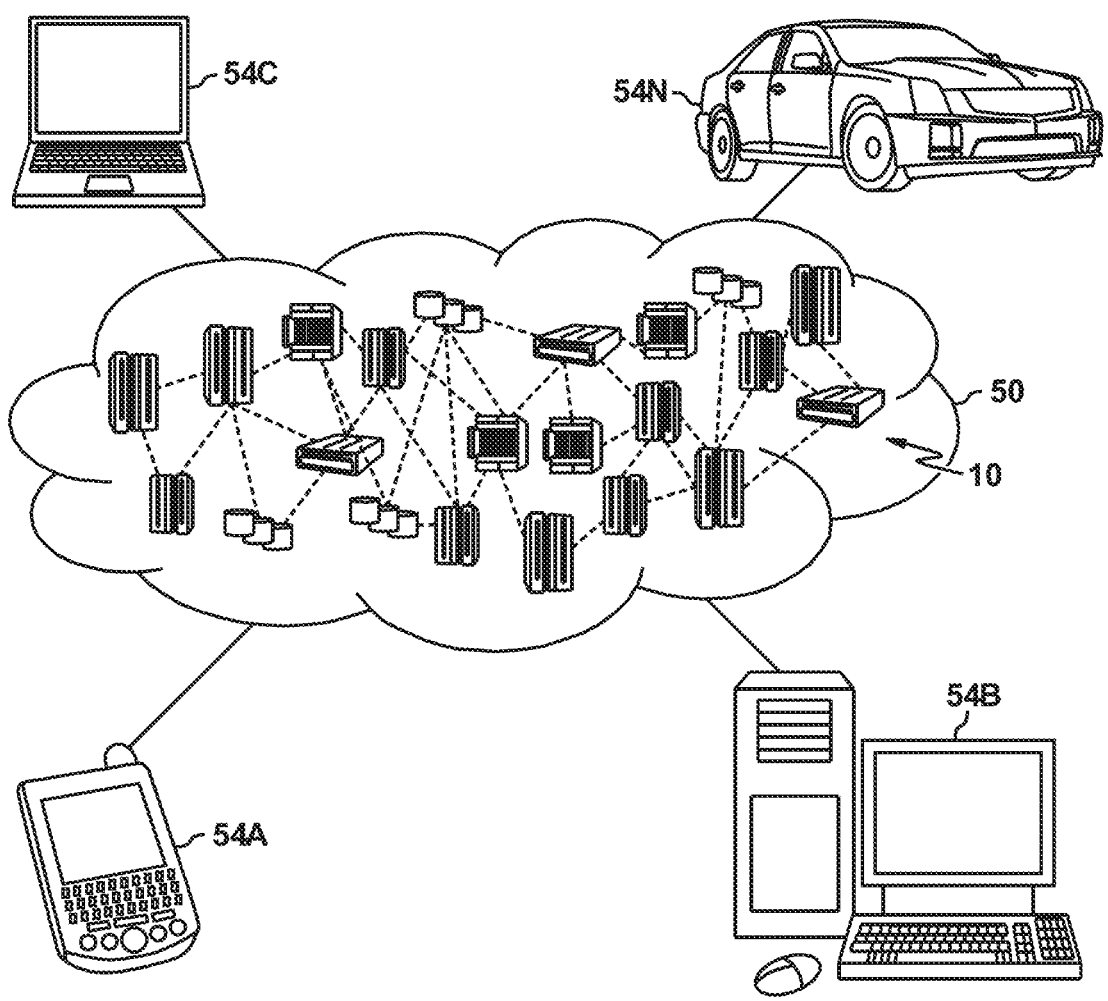
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
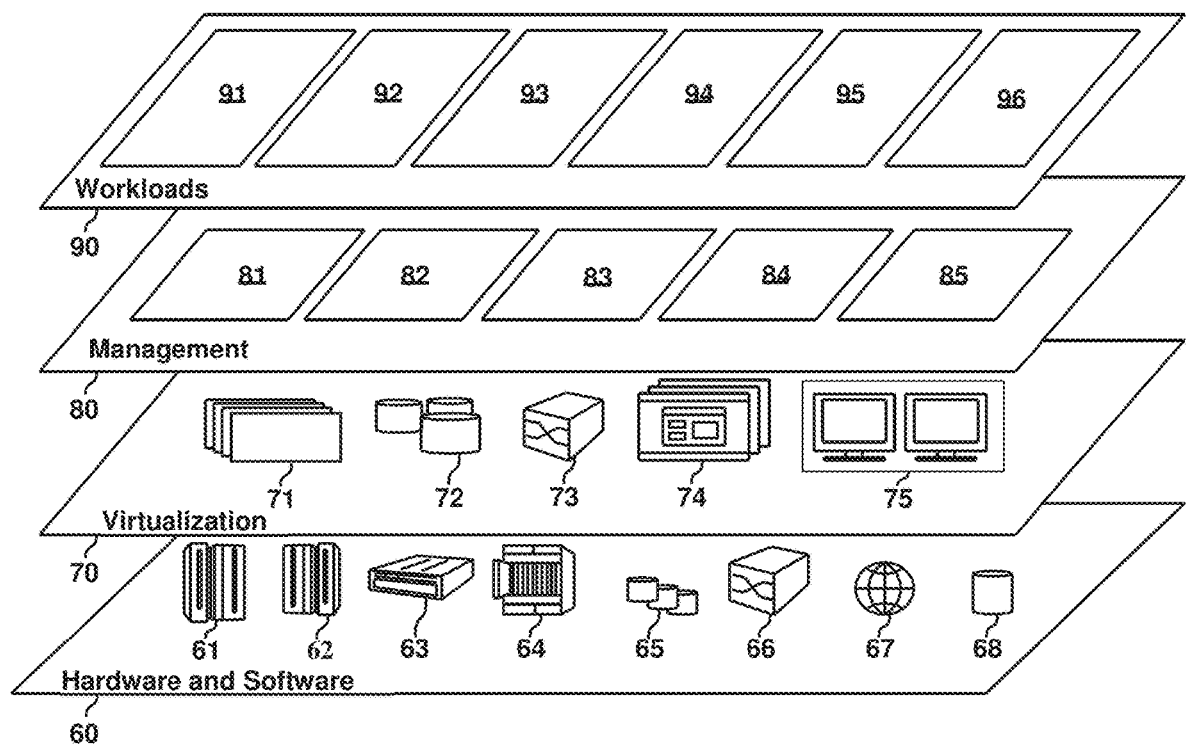
FIG. 8 depicts abstraction model layers, in accordance with embodiments of the present invention.

Referring now to FIG. 8, a set of functional abstraction layers provided by cloud computing environment 50 (see FIG. 6) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API management or the like 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A system for providing cognitive computing services in a decentralized computing infrastructure in which sensor data is distributable between one or more sensors and a set of remote computer servers hosted in a computer network, comprising:

a computing device at an edge of the computer network that is configured to receive the sensor data from the one or more sensors, and that is further configured to perform a preliminary analysis of the sensor data to validate the data to determine whether (i) the sensor data is to be transmitted across the computer network to the set of remote computer servers for further use by at least one computer selected from the group consisting of a first special-purpose computer and a second special-purpose computer or (ii) an analytics operation is to be generated on the sensor data at the edge of the computer network;

the first special-purpose computer that is configured to perform analytics on the sensor data by implementing an algorithmic process stored at the remote computer servers, wherein the algorithmic process includes an analysis of data analyzed by the computing device at the edge of the computer network and received by the remote computer servers; and the second special-purpose computer that is configured to regulate rules performed by at least one device selected from the group consisting of the one or more sensors and the computing device at the edge of the computer network by generating an instruction to modify one or more of the rules according to a result of the analytics of the sensor data performed by the first special-purpose computer.

2. The system of claim 1, wherein the computing device at the edge of the computer network device generates and outputs an early alert or notification in response to receiving and analyzing the sensor data.

3. The system of claim 1, further comprising an Internet of Things (IoT) computer platform that executes a publish-subscribe framework for processing data exchanged with the first special purpose computer, wherein applications registered for a collection receives messages regarding the exchanged data, and is stored in a source repository connected to the first special purpose computer, wherein the first special purpose computer executes training data between the IoT platform and the first special purpose computer.

4. The system of claim 1, wherein the computing device at the edge of the computer network device executes a business rule of the one or more rules to identify elements of the data to process locally.

5. The system of claim 4, wherein the business rule is modified according to a current analysis performed by the computing device at the edge of the computer network device, the first special purpose computer, or the second special purpose computer.

6. The system of claim 1, further comprising a security layer, monitoring layer, and governance and compliance layer that communicates with each of the computing device, remote servers, the first special purpose computer, and the second special purpose computer to provide security extending from the computing device to at least a cloud that includes at least one of the remote servers, the first special purpose computer, and the second special purpose computer.

7. The system of claim 1, wherein the sensors are at an internal network of the edge of the network, and wherein the computing device determines a destination of the sensor data depending on whether a network failure is detected.

8. The system of claim 1, wherein the computing device extends between the sensors and a backend computing system that includes an analytics system of the first special purpose computer so that the sensors generate signals that trigger early alerts or notifications from the rules that are processed by the computing device at the edge of the computer network and therefore does not extend to the backend system.

9. A system for providing cognitive computing services, comprising:

a computing device at an edge of a network that receives data from one or more Internet of Things (IoT) sensors and that performs a preliminary analysis of the IoT sensor data to validate the data to determine whether the data is to be transmitted across the network and receiving cognitive data to generate cognitive analytics locally at an edge of the network or whether the data, in response to a receipt of information regarding a failure whether to output the data to an auxiliary computing location, wherein in response to a receipt of a call complies with the a preprocessing of warning parameters;

a special-purpose computer that uses the IoT sensor data undergoing the preliminary analysis to process a set of data analytics based on a corpus in which patterns and trends are established that incorporate artificial intelligence from the special-purpose computer; and a cognitive computer that is configured to regulate rules performed by at least one device selected from the group consisting of the one or more IoT sensors and the computing device at the edge of the network by generating an instruction to modify one or more of the rules according to a result of the data analytics processed by the special-purpose computer.

10. The system of claim 9, wherein the auxiliary computing location includes a cloud computing or support computing environment.

11. The system of claim 9, further comprising a set of application programming interfaces (APIs) for establish a communication between the the IoT sensors and the special-purpose computer.

12. The system of claim 11, further comprising another special-purpose computer that provides data analysis on the IoT sensor data at a remote storage location of the cloud APIs.

13. The system of claim 12, further comprising an IoT platform that executes a publish-subscribe framework for processing data exchanged with the other special-purpose computer.

14. The system of claim 11, further comprising a security layer that executes a security process that is applied to electronic devices of the system extending from the computing device to at least a cloud computing device, the electronic devices further including storage devices, network devices, and security devices.

15. The system of claim 9, wherein the sensors are at an internal network of the edge of the network, and wherein the computing device determines a destination of the IoT sensor data.

16. The system of claim 9, wherein the computing device extends between the IoT sensor devices and a backend computing system that includes an analytics device so that the IoT sensor devices generate signals that trigger early alerts or notifications from the rules that are processed by the computing device and therefore does not extend to the backend system.

* * * * *